US008155086B2

(12) United States Patent
Jung et al.

(10) Patent No.: US 8,155,086 B2
(45) Date of Patent: Apr. 10, 2012

(54) HANDOVER METHOD BETWEEN SYSTEMS OF MULTI-MODE TERMINAL (75) Inventors: Kwang-Ryul Jung, Daejeon (KR); Ae-Soon Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 513 days.

(21) Appl. No.: 12/517,177

(22) PCT Filed: Nov. 30, 2007

(86) PCT No.: PCT/KR2007/006167
§ 371 (c)(1),
(2), (4) Date: Jun. 1, 2009

(87) PCT Pub. No.: WO2008/066354
PCT Pub. Date: Jun. 5, 2008

(65) Prior Publication Data
US 2010/0074220 A1 Mar. 25, 2010

(30) Foreign Application Priority Data

Dec. 1, 2006 (KR) .................. 10-2006-0120615
Oct. 11, 2007 (KR) .................. 10-2007-0102544

(51) Int. Cl.
*H04W 4/00* (2009.01)
(52) U.S. Cl. ....................... 370/331; 370/338
(58) Field of Classification Search .............. 370/312, 370/331, 332, 335, 338, 390, 432
See application file for complete search history.

(56) References Cited

U.S. PATENT DOCUMENTS

| 2003/0017836 | A1* | 1/2003 | Vishwanathan et al. ....... 455/517 |
| 2003/0026240 | A1* | 2/2003 | Eyuboglu et al. ............. 370/349 |
| 2003/0129981 | A1 | 7/2003 | Kim |
| 2004/0233883 | A1* | 11/2004 | Ludwig et al. ................ 370/338 |
| 2005/0047372 | A1 | 3/2005 | Yano et al. |
| 2005/0281270 | A1* | 12/2005 | Kossi et al. ................ 370/395.5 |
| 2006/0109819 | A1 | 5/2006 | Marin et al. |
| 2006/0120328 | A1* | 6/2006 | Wright et al. ................. 370/331 |
| 2006/0187881 | A1 | 8/2006 | Kwak et al. |
| 2007/0245025 | A1* | 10/2007 | Venkatachalam ............. 709/226 |

FOREIGN PATENT DOCUMENTS

| JP | 2006-197107 | 7/2006 |
| KR | 10-0526408 | 10/2005 |
| WO | WO-2005/076649 A1 | 8/2005 |
| WO | WO-2006/057924 A2 | 6/2006 |

OTHER PUBLICATIONS

Eu, Yong Chu et al., "Multicast Based and Fast Handover Scheme in Mobile IPv6 Wireless Network," *Wireless Personal Communications: An International Journal*, vol. 42(4):509-526 (2007).

* cited by examiner

*Primary Examiner* — Brian Nguyen
(74) *Attorney, Agent, or Firm* — Nelson Mullins Riley & Scarborough LLP; EuiHoon Lee, Esq.

(57) ABSTRACT

The present invention relates to a handover method between systems of a multi-mode terminal. A multi-cast based protocol is added to an Internet protocol (IP) based wireless network to cooperate with the wireless access protocol of the terminal. In addition, minimized processes are added to use the wireless access protocol having wide area coverage. Accordingly, the handover between the systems may be performed while packet loss or service delay caused by a movement of a user may be minimized, and terminal complexity may not be increased.

17 Claims, 4 Drawing Sheets

HANDOVER METHOD BETWEEN SYSTEMS OF MULTI-MODE TERMINAL

RELATED APPLICATIONS

This application is a 35 U.S.C. §371 national stage filing of PCT Application No. PCT/KR2007/006167 filed on Nov. 30, 2007, which claims priority to, and the benefit of, Korean Patent Application No. 10-2006-0120615 filed on Dec. 1, 2006 and Korean Patent Application No. 10-2007-0102544 filed on Oct. 11, 2007. The contents of the aforementioned applications are hereby incorporated by reference.

TECHNICAL FIELD

The present invention relates to a handover method, and more particularly, to a method for performing handover by a multi-mode terminal between systems.

This work was supported by the IT R&D program of MIC/IITA [2005-S-404-32, Research on 4G Mobile Communications Technology].

BACKGROUND ART

As the number of users of Internet application services based on the Internet protocol (IP) increases and various systems including wideband code division multiple access (WCDMA), CDMA2000, wireless local area network (WLAN), wireless personal area network (WPAN) systems have been introduced, it is highly required to combine various heterogeneous networks based on the IP in a next generation environment. To provide appropriate services to a user desiring to receive the services anywhere, it is required to perform an appropriate handover between wireless access systems.

In various vertical handover operations caused between wireless access systems according to a movement of a user, user network subscription conditions, and pricing policies, services to the user must not be disconnected. In addition, it is required to maintain optimum Quality of Service (QoS).

In an IP-based network, when a user moves from one network to another network and a new IP address is allocated to a terminal, previously existing application connections are finished and are required to be re-established. Accordingly, a protocol supplying IP mobility is necessary. Mobile IPv6-based handover considers IP mobility. However, in the Mobile IPv6-based handover, handover is delayed and packets are lost by a home agent and a location registration process such as binding update.

Accordingly, various Mobile IPv6 (MIPv6)-based handover methods have been suggested, but they may not appropriately consider wireless access protocol, or additional functions are added, and therefore terminal complexity may be problematically increased.

In addition, in a quick handover process based on a multi-cast in a MIPv6 wireless network, when a terminal moves to a predetermined external network, the terminal is registered in a home agent and a correspondent node by using a multi-cast address received from a gateway, a base station to which the terminal is accessed and neighboring base stations are grouped as a multi-cast group, and a handover operation is performed. Accordingly, when the terminal moves in the predetermined external network, packet delay or loss may be efficiently reduced without address change or terminal registration.

However, since the terminal wireless access protocol is not appropriately considered in a like manner of the mobile IP protocol, a procedure may be changed or a new procedure is required to be added when the wireless access protocol is used together. In addition, the vertical handover is not considered when the terminal moves to various wireless access environments, a location registration process such as binding update is required to be performed since the MIPv6 is used when the terminal moves from a home agent to an external network or moves from an external network to another external network, and therefore handover delay and packet loss may occur.

Further, in an active handover method between hybrid subscriber unit (HSU) systems, a handover method between a circuit network and a packet network has been suggested. Here, a packet data control switch (PDCS) using at least one of mobile switching center evolution-emulation (MSCe), media gateway (MGW), session initiation protocol (SIP) server, and vocoder trans-coding devices to combine the packet network and the circuit network is suggested, and a handover process between networks having different multi-cast methods is supported.

However, to support handover between various wireless access networks in the active handover between HSU systems, a PDCS for connecting the networks is necessary, where the PDCS controls signals and traffic, and therefore a new protocol between the PDCS and the wireless access system is required. In addition, since traffic is concentrated on the PDCS and handover for services that are not supported by the PDCS is not supported, terminal complexity increases to support handover by the PDCS.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a handover method between systems of a multi-mode terminal without service delay or packet loss.

Technical Solution

According to an exemplary embodiment of the present invention, in a method for performing handover in a first wireless access system when a terminal of the first wireless access system moves to a second wireless access system that is overlapped with the first wireless access system, a handover request message is received from the terminal, a handover preparation request message including a network address of the terminal is transmitted to the second wireless access system based on the handover request message, a handover preparation finish message including information on a multi-cast group generated by the second wireless access system is received based on the network address of the terminal, and the terminal is commanded to perform the handover based on the received handover preparation finish message.

According to another exemplary embodiment of the present invention, in a method for performing handover in a second wireless access system when a terminal of the first wireless access system moves to a second wireless access system that is overlapped with the first wireless access system, a handover preparation request message including a network address of the terminal is received from the first wireless access system, a multi-cast group is generated based on the network address, a handover preparation finish message including information on the multi-cast group is generated, the handover preparation finish message is transmitted to the first wireless access system, and a service is provided to the terminal by using the information on the multi-cast group.

Advantageous Effects

Accordingly, packet loss or service delay caused by a movement of a user may be minimized by cooperation of the IP-based mobility protocol and the wireless access protocol of the terminal.

In addition, since the existing wireless access protocol having wide area coverage is used, the handover between the systems may be performed by adding minimized processes.

Further, location registration processes by the movement of the terminal are minimized by using a handover method by the multi-cast protocol between the systems, and it is not required to change an IP address when the terminal moves. Still further, since the existing wireless access protocol is used, terminal complexity is not increased.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word 'comprise', and variations such as 'comprises' and 'comprising', will be understood to imply the inclusion of stated elements but not the exclusion of any other elements. The term "unit", "module", and "block" used herein mean one unit that processes a specific function or operation, and may be implemented by hardware, software, or a combination thereof.

In the specification, a mobile station (MS) may refer to a terminal, a mobile terminal (MT), a subscriber station (SS), a portable subscriber station (PSS), a user equipment (UE) apparatus, an access terminal (AT), or the like. In addition, the mobile station may include all or some functions of the mobile terminal, the subscriber station, the portable subscriber station, the user equipment apparatus, or the like.

Further, a base station (BS) may refer to an access point (AP), a radio access station (RAS), a Node-B, a base transceiver station (BTS), an MMR-BS, or the like. The base station may include all or some functions of the access point, the radio access station, the Node-B, the base transceiver station, the MMR-BS, or the like.

In an exemplary embodiment of the present invention, a multiple access system includes a plurality of wireless access systems. The wireless access systems are classified into wireless access systems including wideband code division multiple access (WCDMA) and CDMA2000 systems covering a wide area and wireless access systems including wireless local area network (WLAN) and wireless personal area network (WPAN) systems that may be directly connected to the Internet and cover a narrow area.

Figure 1:
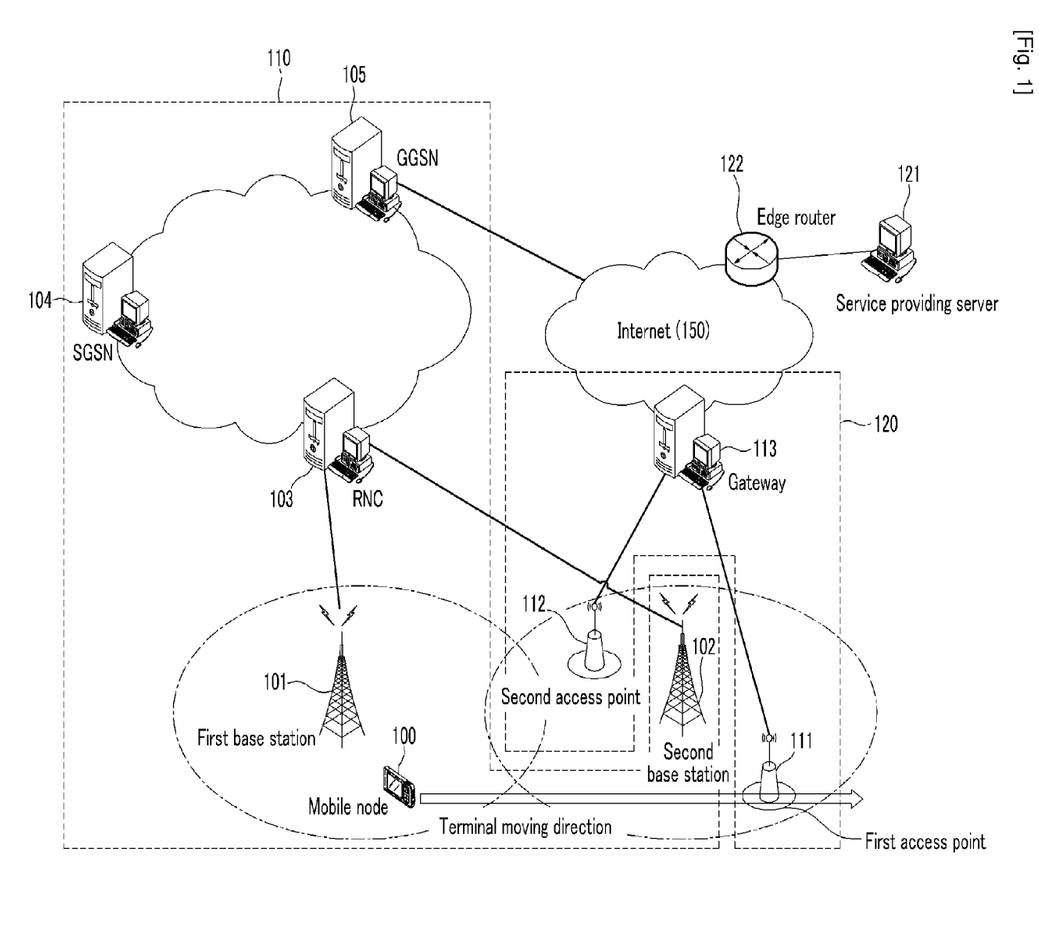
FIG. 1 is a diagram of a multiple access system according to an exemplary embodiment of the present invention.

Particularly, in the exemplary embodiment of the present invention, as shown in FIG. 1, the WCDMA system is exemplified as the wireless access system covering a wide area, and the WLAN system is exemplified as the wireless access system covering a narrow area, but it is not limited thereto, and another wireless access system may be used as a multiple access system.

FIG. 1 is a diagram of a multiple access system according to an exemplary embodiment of the present invention.

As shown in FIG. 1, the multiple access system according to the exemplary embodiment of the present invention includes a first wireless access system 110 covering a wide area and a second wireless access system 120 overlapped with the first wireless access system 110.

As described, in the exemplary embodiment of the present invention, it is illustrated that the first wireless access system 110 is the WCDMA system and the second wireless access system 120 is the WLAN system. In addition, it is assumed that a service providing server 121 connected to an Internet 150 of the multiple access system and a mobile node (MN) 100 communicates with each other through an edge router 122. Here, the service providing server 121 transmits and receives packets to/from the mobile node 100.

In addition, when the second wireless access system 120 is formed as the WLAN system, the second wireless access system 120 includes first and second access points 111 and 112 and a gateway GW 113 that is connected to the Internet 150 to transmit packets between the service providing server 121 and the first and second access points 111 and 112. In this case, the first and second access points 111 and 112 perform base station functions, may be referred to as base stations, and respectively have a cell area.

When the first wireless access system is formed as the WCDMA system, the first wireless access system 110 includes first and second base stations 101 and 102, a gateway general packet radio service support node (GGSN) 105, a service general packet radio service (GPRS) support node (SGSN) 104, and a radio network controller (RNC) 103.

The GGSN 105 performs a wireless gateway function between the SGSN 104 and the Internet 150 so that the mobile node 100 is connected to the Internet 150. The SGSN 104 is matched to the first and second base stations 110 and 120 to perform packet call process, session management, and mobility management functions. The RNC 103 controls the first and second base stations 101 and 102 to manage a radio link. The functions of the above constituent elements are well known to a person of ordinary skill in the art, and therefore detailed descriptions thereof will be omitted in the exemplary embodiment of the present invention. In this case, the first and second base stations 101 and 102 may be respectively referred to as a Node B, and respectively have a cell area.

A handover method according to the exemplary embodiment of the present invention will now be described while assuming that the mobile node 100 is connected to the service providing server 121 in an area of the first base station 101 of the first wireless access system to receive a service and moves to an area of the first access point 111 of the second wireless access system through the second base station 102.

Firstly, a process for the mobile node 100 to initially access the first wireless access system 110 will now be described with reference to FIG. 2.

Figure 2:
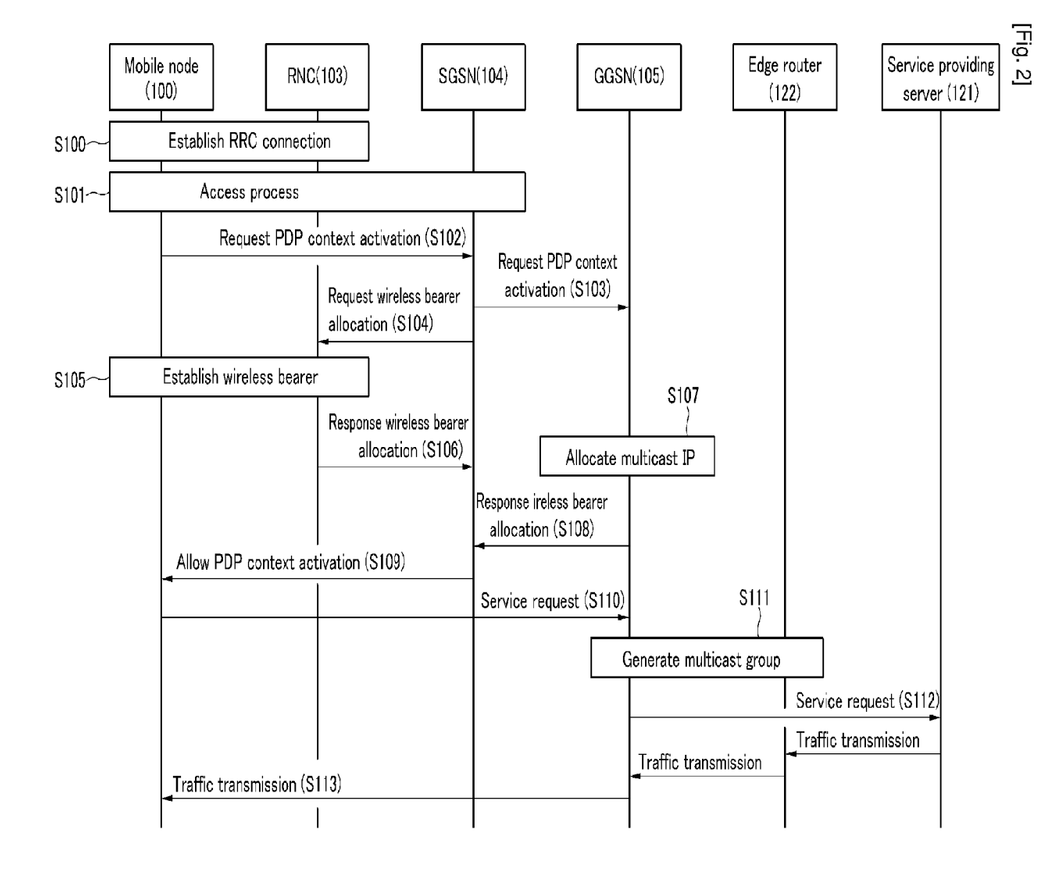
FIG. 2 is a flowchart representing an initial accessing process of a multi-mode terminal according to the exemplary embodiment of the present invention.

FIG. 2 is a flowchart representing an initial accessing process of a multi-mode terminal according to the exemplary embodiment of the present invention.

As shown in FIG. 2, a process for the mobile node 100 to access the first wireless access system 110 and receive a service may be divided into a process for the mobile node 100 to access the first wireless access system 110 and a process for receiving a service from the accessed first wireless access system 110 through a traffic path.

Firstly, the mobile node 100 performs a radio resource control (RRC) connection establishment process (S100) with the first base station 101 and the RNC 103 to generate a signal channel. Here, the mobile node 100 performs the RRC connection establishment process before the mobile node 100 in a universal mobile telecommunications system (UMTS) network communicates with the first base station 101. Through the RRC connection establishment process, various RRC messages are transmitted and received between a mobile node and a base station. The mobile node establishes a signaling radio bearer (SRB) used to transmit/receive the RRC messages when the RRC connection establishment process is performed.

When the RRC connection establishment between the first base station 101 and the RNC 103 is finished, the mobile node 100 performs an attach process of a mobility management (MM) protocol to the SGSN 104 in step S101. The MM protocol is stored in the SGSN 104, the mobile node 100 receives tunneling information established to receive a service or a network address allocated to the mobile node 100 from the SGSN 104. In the exemplary embodiment of the present invention, an Internet protocol (IP) address used in a mobile IP network is exemplified as the network address.

Subsequently, the mobile node 100 accesses the SGSN 104 to transmit an activate packet data protocol (PDP) context request message in step S102. In this case, the SGSN 104 stores session management (SM) protocol information for the mobile node 100, and the activate PDP context request message includes quality of service (QoS) of the mobile node 100, a vertical handover supporting state with another network, and information on a wireless access system to which the mobile node is accessed that are required to generate PDP contexts.

The SGSN 104 transmits a create PDP context request message to the GGSN 105 to establish a GPRS tunneling protocol (GTP) tunnel in step S103, and establishes a radio access bearer (RAB) between the SGGN 104 and the RNC 103. Here, the GTP tunnel is used to perform communication between mobile nodes 100 in an external packet data network and a GPRS network, and is generated when the SGSN in the GPRS network transmits a create PDP context request message.

The RNC 103 receives a message for requesting to allocate the radio access bearer received from the SGSN 104 in step S104, and the message is used to establish a radio bearer between the RNC 103 and the mobile node 100 in step S105. When the radio bearer between the RNC 103 and the mobile node 100 is established, the SGSN 104 receives a radio access bearer allocation response message from the RNC 103 in step S106. In this case, the radio access bearer allocation response message includes QoS information.

The GGSN 105 receiving the create PDP context request message including the QoS and a list of wireless access systems supported by the mobile node 100 from the SGSN 104 allocates an IP address used by the mobile node 100 in step S107. In this case, the allocated IP address is a multi-cast IP address for vertical handover that is used to continuously perform communication without changing the IP address when the mobile node 100 moves to another system (or another heterogeneous network).

The multi-cast IP address for vertical handover that is allocated by the GGSN 105 is included in the create PDP context response message to be transmitted to the SGSN 104 in step S108, and the SGSN 104 adds the multi-cast IP address to an activate PDP context accept message to transmit it to the mobile node 100 in step S109. In this case, the activate PDP context accept message includes the multi-cast IP address for vertical handover of the mobile node 100 and QoS information. After performing the step S109, a tunnel is formed between the mobile node 100 and the GGSN 105, and the mobile node 100 transmits and receives traffic to/from the first wireless access system 110 through the formed tunnel.

When the mobile node 100 establishes a signal and traffic path to the first wireless access system 110 and receives an IP address for providing a service from the GGSN 105, a request for accessing a service in which the corresponding multi-cast IP address for vertical handover is set as a source address and the service providing server 121 is set as a destination address is transmitted to the GGSN 105 in step S110 through the tunnel formed in step S109. Here, the services include voice over Internet protocol (VoIP), WEB, file transfer protocol (FTP), or video on demand (VoD), but they are not limited thereto.

The GGSN 105 receiving the service access request of the mobile node 100 establishes the GGSN 105 to be a multi-cast protocol receiver, and generates an initial access multi-cast group in which the edge router 122 of the service providing server 121 is established as a transmitter in step S111. Subsequently, the GGSN 105 transmits the service access request from the mobile node 100 to the service providing server 121 in step S112 so that a service between the mobile node 100 and the service providing server 121 is provided in step S113.

When an initial access multi-cast tree is formed, the service between the mobile node 100 and the service providing server 121 is provided through the first base station 101 of the first wireless access system. In this case, the service providing server 121 uses the multi-cast address for vertical handover transmitted by the mobile node 100 in step S107 to transmit a packet to a destination address of the packet. The edge router 122 for connecting the service providing server 121 and the Internet transmits the packet from the service providing server 121 to the multi-cast group of the edge router 122, and the packet is transmitted to the GGSN 105 to be transmitted to the mobile node 100 since a receiver subscribed to the edge router 122 at a current time is the GGSN 105.

A method for continuously providing a service to a user when the mobile node 100 receiving the service from the first wireless access system 110 moves to the second wireless access system 120 will now be described with reference to FIG. 3.

Figure 3:
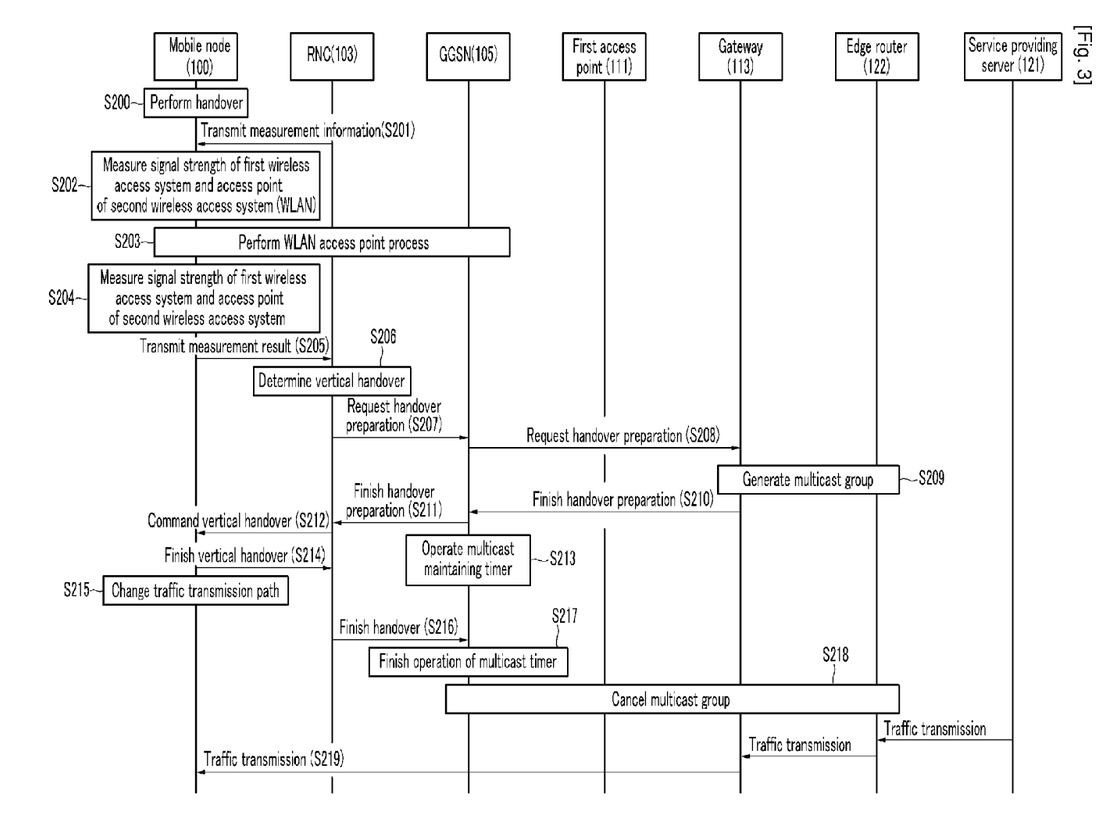
FIG. 3 is a flowchart representing a handover process from a multiple access system to another destination wireless access network according to a movement of a mobile node in the exemplary embodiment of the present invention.

FIG. 3 is a flowchart representing a handover process from a multiple access system to another destination wireless access network according to a movement of a mobile node in the exemplary embodiment of the present invention.

As shown in FIG. 3, when the mobile node 100 moves from an area of the first base station 101 of the first wireless access system 110 to an area of the second base station 102 of the second wireless access system 120, the mobile node 100 performs a handover process from the area of the first base station 101 to the area of the second base station 102 in step S200. A conventional handover process may be used in the WCDMA system.

The RNC 103 uses a measurement control message to transmit measurement information including information on neighboring WCDMA cells (i.e., neighboring base stations of the first wireless access system 110) and information on another wireless access system positioned on the current area to the mobile node 100 in step S201. Here, with regard to the second base station 102, the information on the other wireless access system is information of areas of the first and second access points 111 and 112 of the second wireless access system 120.

That is, the measurement control message includes intra-frequency measurement information of the second base station 102 and inter-radio access technology (RAT) measurement information of the first and second access points 111 and 112. In this case, under assumption that the RNC 103 previously knows the intra-frequency information and inter-RAT information, the control message includes base station information and is transmitted to the mobile node 100.

The RNC 103 previously stores information on the first and second access points 111 and 112 in the area of the second base station 102, and transmits the corresponding information to the mobile node 100 having WCDMA and WLAN functions (i.e., multi-mode functions) when the mobile node 100 performs the handover. When the mobile node 100 does not include a function for receiving a service from the WLAN (i.e., when the mobile node 100 is not a multi-mode terminal but a signal mode terminal), the RNC 103 does not provide the corresponding service but provides a service to the first wireless access system 110.

According to a command of the RNC 103, the mobile node 100 measures wireless environments at the current location (i.e., wireless signal strength of the first wireless access system 110 and signal strength of the first and second access points 111 and 112 in the second wireless access system) in step S202. When the signal strength of the first access point 111 increases to be greater than a previously established first threshold value ThWLAN1 as the mobile node 100 moves, the mobile node 100 starts an access process to the first access point 111 in step S203. That is, when the signal strength of the first access point 111 increases to be greater than the first threshold value, the mobile node 100 does not perform the handover to the first access point 111 but accesses the first access point 111 to receive a service.

When the mobile node 100 accesses the first access point 111, data may be transmitted/received through a WLAN access module of the mobile node 100. In this case, when the mobile node 100 passes through the first access point 111 at a speed that is faster than an established speed, the vertical handover between the first wireless access system and the second wireless access system additionally increases signal traffic, and therefore the data are transmitted/received by the second base station 102 of the first wireless access system.

As described, the mobile node 100 remains in a state accessing the first access point 111 to receive the service, and performs the vertical handover when the mobile node 100 enters the area of the first access point 111. In further detail, when the signal strength of the first access point 111 increases to be greater than a second threshold value $Th_{WLAN2}$ that is greater than the first threshold value as a result of measurement by the mobile terminal 100 in step S204, the mobile node 100 transmits the measurement result in step S205 by using a measurement report message to request the vertical handover to the first access point 111 from the RNC 103.

Here, the mobile node 100 generates an event in which the signal strength of the first access point 111 is greater than the second threshold value $Th_{WLAN2}$ to request handover from the RNC 103. The RNC 103 determines in step S206 whether the handover is performed to the second wireless access system, according to a moving speed of the mobile node 100, a current location of a user, and a moving pattern of the mobile node 100.

Here, the moving pattern of the mobile node 100 is cyclic pattern information of the mobile node 100 that is stored in the base station, and the pattern information is acknowledged based on location information of the mobile node 100. In addition, a global positioning system (GPS) is provided to the mobile node 100, and the location information of the mobile node 100 is used or cycles generated in steps S202 and S204 are used to measure the moving speed of the mobile node 100, but it is not limited thereto.

When the RNC determines the handover to the first access point 111 of the second wireless access system 120 of the mobile node 100, the RNC 103 transmits information of the first access point to which the mobile node 100 performs the handover and information of the mobile node 100 to the GGSN 105 in step S207. The GGSN 105 transmits a handover preparation request message to the gateway 113 connected to the first access point 111 based on the above information to inform a multi-cast IP address of the mobile node 100 in step S208.

The gateway 113 generates a multi-cast group in which the gateway 113 is a receiver of a multi-cast protocol and the edge router 122 of the service providing server 121 is a transmitter in step S209. The GGSN 105 and the gateway 113 previously know information on the multi-cast group, and particularly, the GGSN 105 stores information on the multi-cast protocol supported by the mobile node 100. When the multi-cast group is generated, the gateway 113 informs the GGSN 105 that handover preparation is finished in step S210, and the GGSN 105 transmits the information to the RNC 103 to inform the RNC 103 that handover preparation between networks (i.e., handover from the first wireless access system to the second wireless access system) is finished in step S211.

The RNC 103 uses a bearer, transmission channel, or physical channel variation message to command the mobile node 100 to perform the handover to the first access point 111 of the second wireless access system in step S212. In this case, the command of the handover is performed by reconfiguring a channel. That is, the RNC 103 commands the mobile node 100 to reconfigure channels generated when the mobile node 100 accesses the first wireless access system 110 and receives services such that a channel through which traffic is transmitted is minimized and a channel through which a signal is transmitted is connected, and therefore the vertical handover is informed to the mobile node 100 to be performed.

Subsequently, the mobile node 100 changes a traffic transmission path to the first access point 111 to continuously receive the service provided from the first wireless access system 110. Here, the traffic is transmitted to the mobile node 100 through the edge router 122, gateway 113, and the first access point 111 in step S219. In this case, the RRC connection between the mobile node 100 and the first wireless access system 110 is maintained so that a signal message is transmitted to the mobile node 100. That is, since the vertical handover is commanded by reconfiguring the channels in step S212, the signal message may be transmitted to the mobile node 100.

However, a traffic bearer with the first wireless access system 110 maintains the RRC connection in the case that handover occurs again from the second wireless access system 120 to the first wireless access system 110. In this case, to minimize packet delay or packet loss when the handover is performed, the bearer and transmission channel are varied to establish the RRC connection so that a minimum amount of traffic is transmitted, and resources for actual traffic are not allocated.

The GGSN 105 receiving a message informing that the handover of the mobile node 100 is performed from the first wireless access system 110 to the second wireless access system 120 from the RNC 103 in step S216 determines whether the multi-cast group with the edge router 122 is canceled according to a handover policy used in step S200. The cancellation of the multi-cast group is determined according to an expire state of a multi-cast maintaining timer executed by the GGSN 105 in step S213.

That is, the mobile node 100 determines whether a timer $T_{Leave\_WCDMA}$ established when the handover is performed from the first wireless access system 110 to the second wireless access system 120 is expired, and the GGSN 105 cancels an initial access multi-cast group (i.e., the multi-cast group generated in step S111 shown in FIG. 2) with the edge router 122 in step S218 when the multi-cast timer is expired in step S217. Here, the timer operates in the GGSN 105 when receiving a handover preparation request message in step S207.

Before the multi-cast group is canceled, the edge router 122 transmits traffic to the GGSN 105 and the gateway 113 that are multi-cast members of the edge router 122. When the GGSN 105 cancels the multi-cast group, the GGSN 105 discards packets received from the edge router 122 when the GGSN 105 is subscribed as the multi-cast member and a current location of the mobile node 100 is the second wireless access system 120.

A method for receiving a service through the wireless access system initially accessed in the process shown in FIG. 2 when the mobile node 100 performing the handover from the first wireless access system 110 to the second wireless access system 120 by a process shown in FIG. 3 moves back to the first wireless access system 110 will now be described with reference to FIG. 4.

Figure 4:
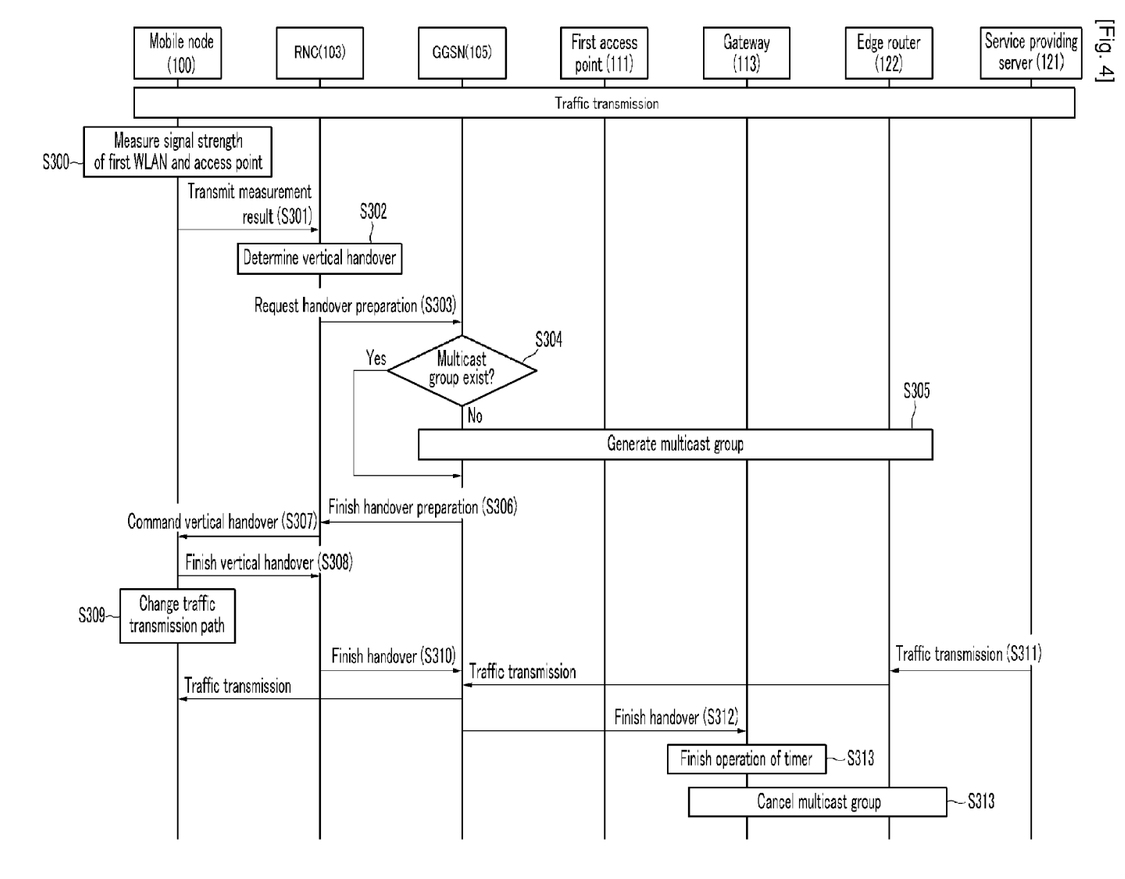
FIG. 4 is a flowchart representing a handover process to an initially accessed wireless access system according to the exemplary embodiment of the present invention.

FIG. 4 is a flowchart representing a handover process to an initially accessed wireless access system according to the exemplary embodiment of the present invention.

As shown in FIG. 4, the mobile node 100 positioned in the area of the first access point 111 receives a packet through the edge router 122, the gateway 113, and the first access point 111. In this case, when the mobile node 100 measures a signal strength in the area of the first access point 111 and the received signal strength of the first access point 111 is lower than a third threshold value $Th_{WLAN3}$ established in the system since the mobile node 100 or a wireless environment varies, the mobile node 100 reports a current state to the RNC 103 through a signal channel of the first wireless access system maintaining the corresponding event in step S301.

The RNC 103 determines in step S302 whether the handover to the first wireless access system 110 is performed according to the moving speed of the mobile node 100, the current location of a user, and the moving pattern of the mobile node 100 in step S206 of FIG. 3. When it is determined that the handover from the second wireless access system to the first wireless access system 110, the RNC 103 transmits the handover preparation request message to the GGSN 105 in step S303, to inform that the mobile node 100 desires to transmit/receive traffic by using the first wireless access system 110.

In this case, the GGSN 105 determines in step S304 whether there is a multi-cast group, and the GGSN 105 registers the edge router 122 as the multi-cast member in step S305 when the multi-cast group with the edge router 122 is canceled due to the expiration of the timer in step S218, as shown in FIG. 3. In addition, when there is the multi-cast group, the GGSN 105 informs the RNC 103 that the handover preparation is finished in step S306.

When the handover preparation is finished, the RNC 103 uses one of bearer, transmission channel, and physical channel variation messages to request reconfiguration of the channel to command the vertical handover in step S307, and receives information on vertical handover finish from the mobile node 100 in step S308. In this case, the RNC 103 commands the mobile node 100 to perform the handover to the first wireless access system 110 by requesting to reconfigure the channel. Subsequently, the mobile node 100 changes the traffic transmission path to the first base station 101 of the first wireless access system 110 in step S309 to continuously receive the service in step S311. Here, the traffic is transmitted to the mobile node 100 through the edge router 122 and the GGSN 105.

When the mobile node 100 finishes the handover to the first wireless access system 110 and receives the service from the first wireless access system 110, the mobile node 100 informs the previous gateway 113 of the handover finish of the mobile node 100 in step S312. The gateway 113 cancels the multi-cast group with the edge router 122 in step S314 when receiving the request for multi-cast group cancellation from the GGSN 105 in step S312 or a predetermined timer $T_{Leave\_WLAN}$ is expired in step S313 when the mobile node 100 leaves the second wireless access system 120 to perform the handover to the first wireless access system 110. A multi-cast group canceling process is well known to a person of ordinary skill in the art, and therefore detailed descriptions will be omitted in the exemplary embodiment of the present invention.

In the WCDMA system covering the wide area and the WLAN system covering the narrow area, since the networks and terminal information are managed in the WCDMA, the vertical handover between the two systems is controlled by the GGSN 105 of the WCDMA system. However, when the handover is performed between wide-area wireless access network systems including the WCDMA system and the CDMA2000 system, one of the two systems may manage the multi-cast group or terminal information according to a policy of the mobile node, but it is not limited thereto.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is

1. A method for performing handover in a first wireless access system when a terminal of the first wireless access system moves to a second wireless access system that is overlapped with the first wireless access system, the method comprising:

receiving a handover request message from the terminal;

transmitting a handover preparation request message including a network address of the terminal to the second wireless access system based on the handover request message;

receiving a handover preparation finish message including information on a multi-cast group generated by the second wireless access system, based on the network address of the terminal; and commanding the terminal to perform the handover based on the received handover preparation finish message.

2. The method of claim 1, further comprising transmitting a control message including information on the second wireless access system to the terminal before receiving the handover request message.

3. The method of claim 2, wherein the information on the second wireless access system includes information on a base station belonging to the second wireless access system, and the control message includes information on neighboring base stations of the first wireless access system.

4. The method of claim 3, wherein the handover request message includes information on signal strength of the base station belonging to the second wireless access system.

5. The method of claim 1, further comprising, after receiving the handover request message, using at least one among measurement information of the terminal, a moving speed of the terminal, a moving pattern of the terminal, and location information of the terminal to determine the handover.

6. The method of claim 1, wherein the multi-cast group includes a first node connecting another terminal that communicates with the terminal to a network and a second node connecting the second wireless access system to the network.

7. The method of claim 1, further comprising:
operating a timer for measuring a distance between the terminal and the first wireless access system;
when an operation of the timer is finished, canceling the generated multi-cast group.

8. The method of claim 7, wherein the multi-cast group includes a first node connecting another terminal that communicates with the terminal to a network and a third node connecting the first wireless access system to the network.

9. The method of claim 7, further comprising:
receiving a measurement information message including information on signal strength of a base station belonging to the second wireless access system; and
determining whether the handover to the first wireless access system is performed based on the signal strength of the base station belonging to the second wireless access system.

10. The method of claim 9, wherein in the determining of the handover, the handover of the terminal is determined when a signal strength of a base station belonging to the second wireless access system that is measured by the terminal is lower than a previously established threshold value.

11. The method of claim 9, further comprising, when the handover to the first wireless access system is performed:
when the timer is expired, generating a multi-cast group including the terminal to access the first wireless access system, and commanding the terminal to perform the handover to the second wireless access system; and
receiving a handover finish message from the terminal, and providing a service through information of the multi-cast group.

12. The method of claim 9, further comprising, when the handover to the first wireless access system is performed and the timer is not expired, providing the service based on the multi-cast group generated by the terminal to access the first wireless access system.

13. The method of claim 1, further comprising:
operating a timer for measuring a distance between the terminal and the first wireless access system;
when an operation of the timer is not finished, maintaining radio resource control (RRC) connection generated for the terminal's accessing the first wireless access system.

14. The method of claim 1, wherein the network address includes a multi-cast internet protocol (IP) address.

15. A method for performing handover in a second wireless access system when a terminal of the first wireless access system moves to a second wireless access system that is overlapped with the first wireless access system, the method comprising:
receiving a handover preparation request message including a network address of the terminal from the first wireless access system;
generating a multi-cast group based on the network address;
generating a handover preparation finish message including information on the multi-cast group and transmitting the handover preparation finish message to the first wireless access system; and
providing a service to the terminal by using the information on the multi-cast group.

16. The method of claim 15, wherein the multi-cast group includes a first node connecting another terminal that communicates with the terminal to a network and a second node connecting the first wireless access system to the network.

17. The method of claim 15, wherein the network address includes a multi-cast Internet protocol (IP) address.

* * * * *